(12) United States Patent
Edeline et al.

(10) Patent No.: US 8,157,502 B2
(45) Date of Patent: Apr. 17, 2012

(54) PUMP WITH AN ELASTIC DEVICE ON A ROLLING BEARING

(75) Inventors: Emmanuel Edeline, Ecos (FR); Charles Marciquet, Bois Jerome (FR); Laurent Fabbri, Meulan (FR); Fabien Wahl, Saint Marcel (FR)

(73) Assignee: SNECMA, Paris (FR)

( * ) Notice: Subject to any disclaimer, the term of this patent is extended or adjusted under 35 U.S.C. 154(b) by 1080 days.

(21) Appl. No.: 12/004,458

(22) Filed: Dec. 19, 2007

(65) Prior Publication Data

US 2008/0170937 A1 Jul. 17, 2008

(30) Foreign Application Priority Data

Dec. 19, 2006 (FR) ..................... 06 55639

(51) Int. Cl.
*F04D 29/04* (2006.01)
(52) U.S. Cl. ........ 415/111; 415/113; 415/140; 415/142; 415/174.2; 415/229
(58) Field of Classification Search ............... 415/170.1, 415/229, 111, 113, 140, 142, 174.2
See application file for complete search history.

(56) References Cited

U.S. PATENT DOCUMENTS

| 4,911,610 A | 3/1990 | Olschewski et al. |
| 5,232,334 A | 8/1993 | Mechin et al. |
| 6,918,746 B2 * | 7/2005 | Duerr et al. ................... 415/206 |

FOREIGN PATENT DOCUMENTS

| DE | 102 46 694 A1 | 4/2004 |
| EP | 0 484 209 A1 | 5/1992 |
| FR | 2 056 413 A | 5/1971 |
| FR | 2 615 253 A1 | 11/1988 |
| JP | 57 195897 A | 12/1982 |

* cited by examiner

*Primary Examiner* — Igor Kershteyn
(74) *Attorney, Agent, or Firm* — Weingarten, Schurgin, Gagnebin & Lebovici LLP

(57) ABSTRACT

Pump (1) comprising a rotary shaft (30), a bearing housing (80) that is fixed relative to the rotary shaft, at least one rolling bearing (70) the inner ring (71) of which is connected to the said rotary shaft and the outer ring (76) of which is able to slide in this housing along the axis of rotation of the rotary shaft. The bearing housing (80) comprises a shoulder (81) situated on one side of this bearing and able rigidly to prevent translational movement of the outer ring (76) along the axis of rotation, and a deformable elastic device (100) fixed to the housing on the other side of the bearing (70) so that the bearing lies between the shoulder and the elastic device.

10 Claims, 2 Drawing Sheets

PUMP WITH AN ELASTIC DEVICE ON A ROLLING BEARING

This application claims priority to French application No. 06 55639 filed Dec. 19, 2006.

The present invention relates to the field of pumps, particularly liquefied gas pumps.

The invention relates more specifically to a pump comprising a rotary shaft, a bearing housing that is fixed relative to the rotary shaft, at least one rolling bearing the inner ring of which is connected to the said rotary shaft and the outer ring of which is able to slide in the said housing along the axis of rotation of the said rotary shaft.

In a pump positioned vertically in a reservoir filled with fluid, and intended to pump this fluid in which it is immersed, a rotor comprises a rotary shaft rotationally driven by an electric motor and to which drive means (for example an induction unit or a centrifugal impeller) are attached, these being immersed in the fluid and able to cause this fluid to circulate upwards along the rotary shaft. Thereafter, other means, for example a centrifugal impeller, move the fluid radially away from the rotary shaft so that the fluid then circulates upwards along the outside of the motor vertically (parallel to the rotary shaft) and is expelled at the other end of the pump.

Mounted on the rotary shaft are two ball bearings, a lower bearing below the motor, and an upper bearing above the motor. These rolling bearings are also mounted on bearing housings secured rigidly to the outer casing of the pump, and therefore support the rotary shaft in its rotational movement. The bearing housing does not rotate when the rotary shaft rotates. Thus, the inner ring of the lower bearing is rigidly fixed to the rotary shaft and its outer ring is mounted in a bore in the bearing housing in such a way that this outer ring is able to slide axially in the bore of the housing. When the motor and therefore the rotor are not turning, the underside of the outer ring of the lower bearing rests on a horizontal shoulder of the housing so that this horizontal shoulder vertically supports the weight of the rotor, via the lower bearing.

In normal operation (when the rotor is turning), the horizontal shoulder in addition bears the downwardly directed axial reaction exerted by the fluid on the drive means as a result of the fluid being driven upwards, and therefore on the rotary shaft. There is therefore an axial load on the lower bearing, this load being exerted by the rotary shaft and reacted by the horizontal shoulder (on the outer ring of the lower bearing). In order to relieve the lower bearing and axially balance the rotor, an axial balancing mechanism connected to the centrifugal impeller which is secured to the rotary shaft exerts an upward thrust on the rotary shaft, thus eliminating the axial load to which the lower bearing is subjected.

If the rotary shaft turns in the opposite direction to its direction of operation because the motor power supply electrical phases have been swapped over (for example through human error), the drive means fixed to the rotary shaft and which rotate with it (for example an induction unit or centrifugal impeller) will propel the fluid downwards instead of driving it upwards. The reaction force of the fluid on these drive means will therefore push the rotary shaft upwards. The centrifugal impeller will therefore rise up and rub against the bearing housing, thus leading to undesirable wear on the centrifugal impeller and/or on the housing (particularly the rotor axial balancing mechanism described in greater detail later).

It has been conceived of for a rigid stop to be fixed to the housing above the lower bearing so that as the rotary shaft rises upwards as a result of the rotary shaft turning in the opposite direction, the upper face of the outer ring of the lower bearing comes into contact with this rigid stop and is halted before the centrifugal impeller comes into frictional contact with the housing. The disadvantage with this solution is that in the event of a "pressure surge", that is to say a sudden increase in pressure in the fluid caused by a hydraulic incident, the lower bearing will become damaged. This is because the rotary shaft will then be thrust sharply upwards: the outer ring of the lower bearing, prevented from moving by the rigid stop, will not move upward, while the inner ring of the lower bearing, which is secured to the rotary shaft, will be sharply driven upwards with a force of very high magnitude (due to the sudden increase in pressure in the fluid). The lower bearing will therefore be subjected to a very high axial load and will be damaged, or even destroyed, requiring it to be replaced.

Furthermore, it is known that it is beneficial for a bearing to be subjected to a slight preload along its axis of rotation. This is because a slight axial preload between the inner ring and the outer ring of the bearing ensures constant contact between the balls and these rings and prevents repeated dynamic impacts as the bearing turns. A rigid stop fixed to the housing does not allow a preload to be exerted on the lower bearing with enough precision to fall within the optimal zone in which the preload extends the life of the lower bearing.

The present invention aims to remedy these disadvantages.

The invention aims to propose a pump in which there is no frictional contact between the centrifugal impeller and the housing as the pump runs in the opposite direction, and in which the bearing sustains no damage in the event of a "pressure surge".

This objective is achieved by virtue of the fact that the bearing housing comprises a shoulder situated on one side of the bearing and able rigidly to prevent translational movement of outer ring along the axis of rotation, and a deformable elastic device fixed to the housing on the other side of the bearing so that the bearing lies between the shoulder and the elastic device.

Advantageously, when running in reverse, the elastic device is able to prevent the said outer ring from moving along the axis of rotation to such an extent that part of a component attached to the rotary shaft rubs against the housing.

By virtue of these measures, if the rotary shaft rotates in the opposite direction, the fluid is propelled downwards by the fluid drive means and, by reaction, causes the rotary shaft to rise upwards, and the upper face of the outer ring of the bearing thus comes into contact with the elastic device and then pushes against it. The properties of this elastic device (its dimensions and material) are chosen such that the elastic device is sufficiently able to withstand the movement of the outer ring that it prevents this, and therefore the rotary shaft, from moving upwards to such an extent that the centrifugal impeller, which is connected to the rotary shaft and which moves as one therewith, rubs against the housing.

In the case of a "pressure surge", the rotary shaft, and therefore the bearing, is propelled sharply upwards and impacts the elastic device with a very high force. Since the elastic device is deformable, the movement of the rolling bearing is not therefore halted by this elastic device which thus exerts on the rolling bearing only an axial force which is unable to damage it. The "pressure surge" is damped only by contact between the centrifugal impeller and the housing and this contact is of sufficiently brief duration that these components are not damaged by friction.

Advantageously, the elastic device comprises a first elastic element of stiffness k1 and a second elastic element of stiffness k2 greater than k1 positioned above the first elastic element and exerting no force on the said outer ring as long as the distance between it and the shoulder remains below a certain value.

Advantageously, when the pump is running normally the first elastic element of stiffness k1 is able to exert on the outer ring a force which extends the life of the bearing.

Thus, the fact that the elastic device comprises a first elastic element and a second elastic element of different stiffnesses allows this device to exert on the outer ring of the bearing both a preload which extends the life of the bearing during normal pump running and a force which prevents excessive upward movement of the rotary shaft and which would lead to undesirable contact between the upper face of the centrifugal impeller and the lower face of the housing when the pump is running in reverse. In normal operation, the first elastic element constantly exerts on the outer ring of the bearing a slight preload which lies within the range of preloads in which the life of the bearing is lengthened. This preload is not enough to resist the upward movement of the bearing and of the rotary shaft should the motor rotate in the opposite direction. The first elastic element is therefore deformed upwards by the outer ring of the bearing as far as the second elastic element. This second elastic element has a stiffness k2 greater than k1 and high enough to exert on the outer ring of the bearing a force which prevents the bearing and the rotary shaft from moving upwards excessively to such a point that there is contact between the upper face of the centrifugal impeller and the lower face of the housing.

The invention will be better understood and its advantages will become better apparent from reading the detailed description which follows of an embodiment which is given by way of nonlimiting example. The description makes reference to the attached drawings in which.

Figure 1:
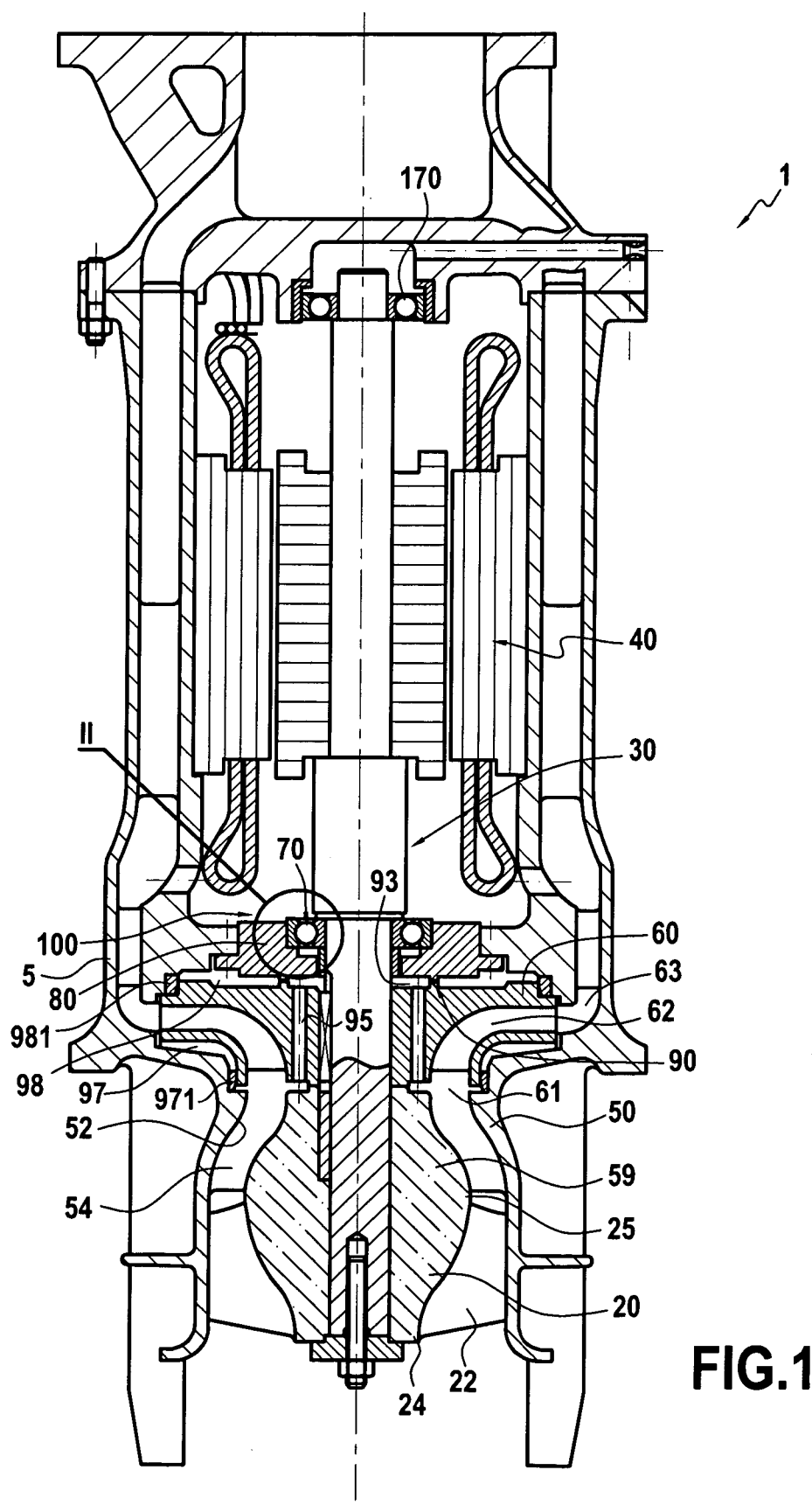
FIG. 1 is a view in longitudinal section of a pump according to the invention.

In a pump 1 positioned in a reservoir filled with fluid and intended to pump this fluid in which it is immersed, a rotary shaft 30 driven by an electric motor 40 rotationally drives an induction unit 20 which causes the fluid to circulate in a direction parallel to the rotary shaft 30. A pump 1 such as this is depicted in FIG. 1. The fluid is, for example, liquefied natural gas and the reservoir is a tank on a cargo ship or dockside. The induction unit 20 which is fixed to the rotary shaft 30 is substantially in the shape of a cone which, on its exterior surface, bears vanes 22. The induction unit 20 rotates on itself about the axis of the rotary shaft 30 such that the vanes 22 propel the fluid in which they are immersed from the tip 24 of the cone towards its widest-diameter part 25. The fluid then continues to progress along the motor 40 in an annular duct on the outside of the cavity in which the electric motor is housed, which motor is situated above the induction unit 20. Between the induction unit 20 and the motor 40 the pump may have a set of guide vanes 54 and comprises a centrifugal impeller 60. In this case, the cone of the induction unit is continuously extended by an element 59 the axis of symmetry of which is the axis of the rotary shaft and the diameter of which decreases from the broadest-diameter part 25 of the cone. This element 59 is surrounded by the part 50 of the case bearing the set of guide vanes 54, which is centred on the axis of rotation of the rotary shaft 30 and is fixed with respect to the latter and which surrounds a central region the diameter of which decreases with that of the element 59 so that the distance between the outer surface of the element 59 and the internal wall 52 of the part 50 of the case to which the set of guide vanes 54 surrounding the central region is attached is substantially constant. The fluid circulating through the central region is thus kept closer to the rotary shaft 30. The set of guide vanes 54 comprises vanes positioned in such a way that the fluid, given an essentially circumferential movement as it enters the set of guide vanes 54, is given an essentially axial movement as it leaves the set of guide vanes 54. Above the set of guide vanes 54, the centrifugal impeller 60, driven by the rotary shaft 30 to which it is attached, has ducts 64 which move the fluid radially away from the rotary shaft 30 so that the fluid then flows along the outside of the motor 40 in an axial direction (parallel to the rotary shaft 30) and upwards.

Figure 2:
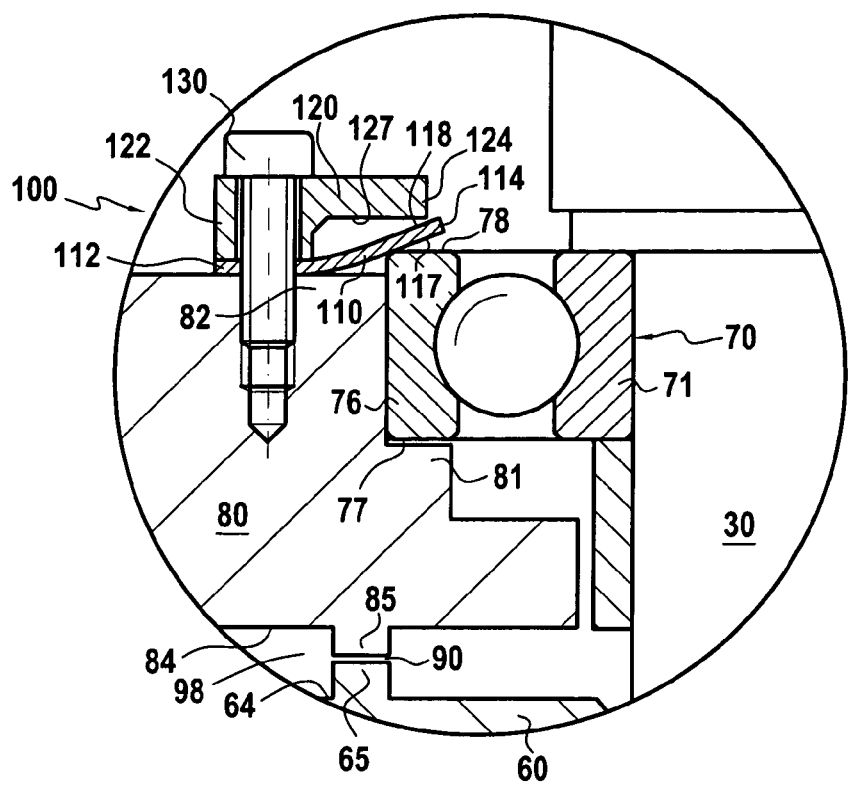
FIG. 2 is a view of region 2 of FIG. 1.

Mounted on the rotary shaft 30 are two ball bearings, a lower bearing 70 below the motor 40, and an upper bearing 170 above the motor 40. As depicted in FIG. 2, the inner ring 71 of the lower bearing 70 is rigidly fixed to the rotary shaft 30 and the outer ring 76 is housed in a bearing housing 80 (this housing 80 does not rotate as the rotary shaft 30 rotates) such that this outer ring 76 is able to slide axially and to rotate relative to the housing 80. The housing 80 is itself secured to the outer casing 5 of the pump 1. The outer ring 76 of the lower bearing 70 is therefore capable of translational movement in the bore in the housing 80 in which it is mounted. In the reservoir that it is to empty, the pump 1 (and therefore the rotary shaft 30) is vertical and drives the fluid upwards. When the motor 40 and therefore the rotary shaft 30 are not rotating, the lower face 77 of the outer ring 76 of the lower bearing 70 rests on a horizontal shoulder 81 of the housing 80 such that this horizontal shoulder 81 vertically supports the weight of the rotary shaft 30, via the lower bearing 70.

In normal operation (when the rotary shaft is turning), the horizontal shoulder 81 additionally bears the downwardly directed axial reaction exerted by the fluid on the induction unit 20 resulting from the fluid being driven upward by the induction unit 20. There is therefore an axial load on the lower bearing 70, exerted by the rotary shaft 30 and reacted by the horizontal shoulder 81 (on the outer ring 76 of the lower bearing 70). In order to relieve the lower bearing 70 and axially to balance the rotary shaft 30, an axial balancing mechanism (described hereinbelow) connected to the centrifugal impeller 60 which is secured to the rotary shaft 30, exerts an upward thrust on the rotary shaft 30 thus compensating for the axial load to which the lower bearing 70 is subjected. The movement of the rotary shaft 30 as a result of this thrust is engineered to maintain a space between a rib 85 of the housing 80 situated on the lower face 84 of the housing 80 and an impeller rib 65 situated on the upper face 64 of the centrifugal impeller 60, these two ribs together defining an annular passage 90 so that there is no friction between these two ribs.

The axial balancing mechanism is a dynamic one and works by fluidic coupling and its principle is described hereinbelow. With reference to FIG. 1, it can be seen that two fluid tappings are taken off the ducts 62 of the centrifugal impeller 60. The first tapping leads the fluid into a substantially horizontal annular first chamber 97 situated under the centrifugal impeller 60, more specifically between the centrifugal impeller 60 and the outer casing 5. The second tapping leads the fluid into a substantially horizontal annular second chamber 98 situated above the centrifugal impeller 60, more specifically between the centrifugal impeller 60 and the housing 80. The fluid freely enters the first chamber 97 via its radially outer end. At the other end of the first chamber 97, that is to say at its radially innermost end, there is first labyrinth seal 971 which reduces the flowrate of fluid leaving the first chamber 97 towards the inlet 61 of the ducts 62. As a result, the pressure in the chamber 97 is substantially equal to the pressure of the exit 63 of the ducts 62, that is to say is a high pressure. Between the ducts 62 and the second chamber 98, that is to say at the radially outermost end thereof, there is a second labyrinth seal 981, so that the flowrate of fluid entering the second chamber 98 is low. At the radially innermost end of the second chamber 98 there is the annular passage 90 which is defined by the rib 85 of the housing 80 and the impeller rib 65, which ribs are annular, coaxial, and facing one another. An annular discharge space 93 runs radially between the annular passage 90 and the rotary shaft 30. It communicates with the inlet 61 of the ducts 62, which is at low pressure, by re-injection ducts 95 made in the impeller 60. Thus, the annular discharge space 93 finds itself constantly at more or less the low pressure obtaining at the inlet 61 to the centrifugal impeller 60. As a result, the fluid pressure in the second chamber 96 is at low pressure and is lower than the fluid pressure in the first chamber 97. This pressure differential between the first chamber 97 and the second chamber 98 creates an upwards thrust exerted on the centrifugal impeller 60. The centrifugal impeller 60 and the rotary shaft 30 are therefore thrust upwards, compensating for the axial force to which the lower bearing 70 is subjected. At the same time, because the centrifugal impeller 60 is moving closer to the housing 80, the distance between the rib 85 of the housing 80 and the impeller rib 65 diminishes and the size of the annular passage 90 between the rib 85 and the impeller rib 65 also therefore reduces. Given that the fluid can flow out of the second chamber 98 only via the space through the annular passage 90, the fluid flowrate leaving the second chamber 98 is low when this space becomes smaller. The pressure in the second chamber 98 therefore increases, thus reducing the pressure differential between the first chamber 97 and the second chamber 98 and therefore decreasing the thrust exerted on the centrifugal impeller 60. As a result, the centrifugal impeller 60 drops down again, this increasing the magnitude of the annular passage 90, this increasing the pressure differential between the first chamber 97 and the second chamber 98 and therefore moving the centrifugal impeller 60 upwards. It can be readily understood how this fluid coupling mechanism described hereinabove makes it possible to maintain a substantially constant size of annular passage 90 between the rib 85 and the impeller rib 65. In other words, the impeller rib 65 and the rib 85 situated on one face of the housing 80 define an annular passage 90 that can be used for axial balancing of the rotary shaft 30.

If the rotary shaft 30 rotates in the opposite direction to its normal direction of operation because the power supply phases of the motor 40 have been swapped over (for example as a result of human error), the induction unit 20 will propel the fluid downwards instead of upwards. The reaction force of the fluid on the induction unit 20 will therefore drive the rotary shaft 30 upwards. The impeller rib 65 will therefore rub against the rib 85 of the housing 80, which will lead to undesirable wear on the centrifugal impeller 60 and/or on the housing 80 (and, in addition, the absence of a space between the ribs will nullify an axial balancing of the rotary shaft 30).

To avoid this undesirable friction, the pump 1 comprises an elastic device 100 which is illustrated in detail in FIG. 2. The housing 80 comprises, on a second horizontal shoulder 82, a first elastic element 110 and a second elastic element 120. The elastic device 100 therefore comprises the first elastic element 110 and the second elastic element 120. In the example described, the first and second elastic elements 110, 120 are annular washers. The outer end 122 of the second elastic element 120 lies in contact with and above the outer end 112 of the first elastic element 110, and these two outer ends are fixed to this second shoulder 82 by screws 130. These outer ends could be attached by some other means, for example could be clamped between the second shoulder 82 and a rigid component fixed rigidly to the housing 80. The inner end 124 of the second elastic element 120 and the inner end 114 of the first elastic element 110 are free to deform in bending under the effect of a vertical force (that is to say of a force in the direction of the axis of rotation of the rotary shaft 30). The first shoulder 81 and the second shoulder 82 of the housing are spaced apart vertically such that in normal operation the axial balancing mechanism keeps the lower bearing 70 at a level such that the upper face 78 of the outer ring 76 of the lower bearing 70 is in contact with and exerts a force on the lower face 117 of the inner end 114 of the first elastic element 110, the lower face 77 of the lower bearing 70 being in contact with the shoulder 81 or slightly spaced apart from the latter according to the heightwise fluctuations of the rotary shaft 30 caused by the axial balancing mechanism. The inner end 114 of the first elastic element 110 is therefore pushed upwards by the upper face 78 of the outer ring 76 of the lower bearing 70. The first elastic element 110 (together with the rotary shaft 30) therefore exerts an axial force C on the lower bearing 70 in the direction of its axis of rotation, and the dimensions and mechanical properties of the first elastic element 110 are calculated such that the force C falls in the optimum region of preload on the lower bearing 70. Thus, the life of the lower bearing 70 is lengthened, and this is beneficial.

The inner end 124 of the second elastic element 120 is spaced vertically away from the inner end 114 of the first elastic element enough that the lower face 127 of the inner end 124 of the second elastic element 120 is not in contact with the upper face 118 of the inner end 114 of the first elastic element 110 when the pump is running normally. There is therefore a functional clearance between the first elastic element 110 and the second elastic element 120. Thus, when the pump is running normally, the second elastic element 120 exerts no load on the upstream bearing 70.

If the motor 40 turns in the opposite direction to the direction in which it turns when the pump is running normally then the rotary shaft 30 is driven upwards and carries the bearing 70 with it. The upper face 78 of the outer ring 76 of the lower bearing 70 then exerts a maximum force F. This force F is high enough to bend the inner end 114 of the first elastic element 110 upwards until this end comes into contact with the inner end 124 of the second elastic element 120 and drives it upwards. The dimensions and mechanical properties of the second elastic element 120 are chosen such that the maximum force that the first and second elastic elements 110, 120 can exert on the lower bearing 70 to prevent it from moving upwards is greater than the force F. Thus, the upwards movement of the lower bearing 70 is halted by the first and second elastic elements 110, 120 such that the rib 85 of the lower face 84 of the housing 80 does not touch the impeller rib 65, and such that there is a space between the rib 85 of the lower face 84 of the housing 80 and the impeller rib 65.

In the event of a "pressure surge", the rotary shaft 30, and therefore the rolling bearing 70, is driven sharply upwards and impacts the elastic device 100. Because they are deformable, the first and second elastic elements 110, 120 therefore bend without exerting on the lower bearing 70 any shear force liable to damage it. The "pressure surge" is damped solely by short-term contact between the impeller rib 65 and the rib 85 of the housing 80.

Figure 3:
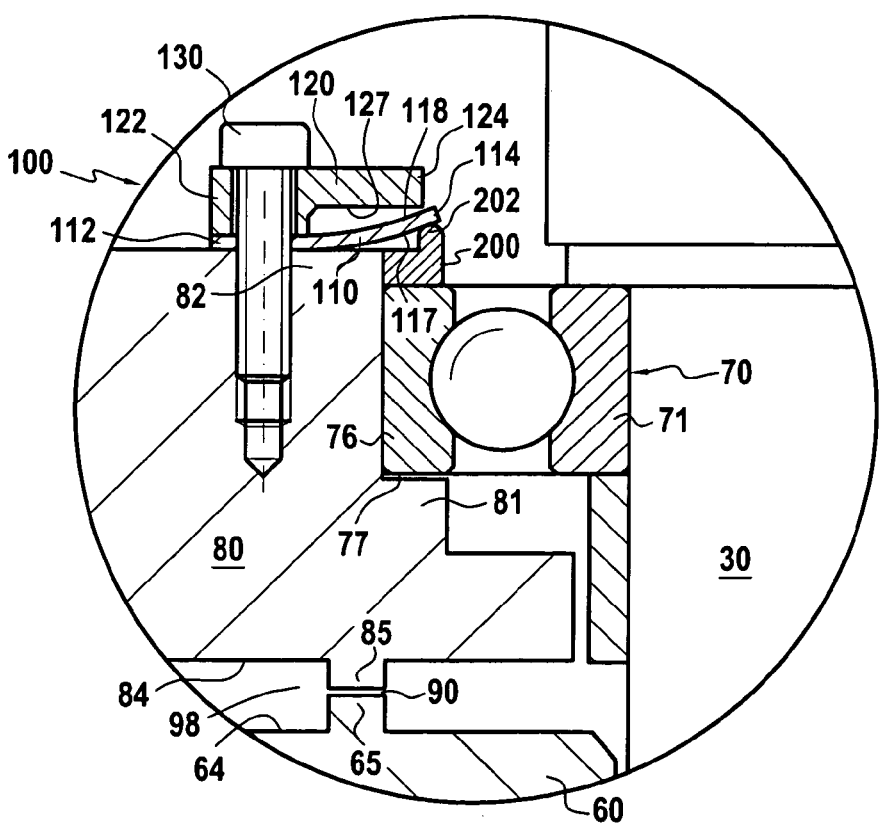
FIG. 3 is a view corresponding to region 2 of FIG. 1 but illustrating another embodiment of a pump according to the invention.

According to another embodiment of the invention, the first shoulder 81 and the second shoulder 82 of the housing are spaced vertically apart by a distance greater than the thickness of the lower bearing 70 so that a rigid pusher 200 can be housed between the upper face 78 of the outer ring 76 of the upstream bearing 70 and the lower face 117 of the inner end 114 of the first elastic element 110, as depicted in FIG. 3. Thus, the lower face of the pusher 200 rests on the upper face 78 of the outer ring 76 of the upstream bearing 70. At its interior end, the pusher 200 has a vertical protrusion 202. In normal operation, the axial balancing mechanism keeps the lower bearing 70 at a level such that the vertical protrusion 102 is in contact with and exerts a force on the lower face 117 of the inner end 114 of the first elastic element 110. The inner end 114 of the first elastic element 110 is therefore pushed upwards via the vertical protrusion 202. The first elastic element 110 therefore, via the pusher 200, exerts a force C' on the lower bearing 70 in the direction of its axis of rotation, and the dimensions and mechanical properties of the first elastic element 110 and the dimensions of the pusher 200 and of the protrusion 202 are calculated such that the force C' falls within the optimal region of preload for the lower bearing 70. Thus, the life of the lower bearing 70 is extended, and this is beneficial.

The invention claimed is:

1. A pump comprising a rotary shaft, a bearing housing that is fixed relative to the rotary shaft, and at least one rolling bearing an inner ring of which is fixedly attached to said rotary shaft and an outer ring of which is able to slide in said bearing housing along an axis of rotation of said rotary shaft, characterized in that said bearing housing comprises a shoulder situated on one side of said bearing and structured and arranged to rigidly prevent translational movement of said outer ring along said axis of rotation, and a deformable elastic device fixed to said bearing housing on another, opposite side of said bearing so that said bearing lies between said shoulder and said elastic device.

2. The pump according to claim 1, characterized in that, when running in reverse, said elastic device prevents said outer ring from moving along the axis of rotation to such an extent that part of a component attached to said rotary shaft rubs against a portion of said bearing housing.

3. The pump according to claim 1, characterized in that said elastic device comprises a first elastic element of stiffness k1, and a second elastic element of stiffness k2 greater than k1, positioned with respect to said first elastic element in such a way that the first elastic element lies between said bearing and the second elastic element, this second elastic element exerting no force on said outer ring as long as the distance between the latter and said shoulder remains below a certain value.

4. The pump according to claim 3, characterized in that in normal operation thereof, said first elastic element of stiffness k1 is designed to exert on said outer ring a force that extends the life of said bearing.

5. The pump according to claim 2, characterized in that there is a functional clearance between the first elastic element and the second elastic element.

6. The pump according to claim 2, characterized in that said component attached to said rotary shaft is a centrifugal impeller, the part of said component attached to said rotary shaft is an impeller rib situated on one face of said centrifugal impeller, and said portion of said bearing housing is a rib situated on one face of said bearing housing.

7. The pump according to claim 6, characterized in that said impeller rib and said rib situated on one face of said housing together define an annular passage used for axially balancing said rotary shaft.

8. The pump according to claim 3, characterized in that the first and second elastic elements are annular washers fixed at their outer ends to said housing by fasteners, the inner ends of said washers being free to deform in bending in the direction of the axis of rotation of said rotary shaft.

9. The pump according to claim 3, characterized in that a pusher is situated between the first elastic element and the outer ring of said rolling bearing, said first elastic element of stiffness k1 being able to press said pusher firmly against said outer ring in such a way that when the pump is running normally, the pusher is able to exert on said outer ring a force which extends the life of said bearing.

10. The pump according to claim 2, characterized in that:
said elastic device comprises a first elastic element of stiffness k1, and a second elastic element of stiffness k2 greater than k1, positioned with respect to said first elastic element in such a way that the first elastic element lies between said bearing and the second elastic element, this second elastic element exerting no force on said outer ring as long as the distance between the latter and said shoulder remains below a certain value;
in normal operation thereof, said first elastic element of stiffness k1 is designed to exert on said outer ring a force that extends the life of said bearing;
there is a functional clearance between the first elastic element and the second elastic element;
said component connected to said rotary shaft is a centrifugal impeller, the part of said component connected to said rotary shaft is an impeller rib situated on one face of said centrifugal impeller, and said part of the housing is a rib situated on one face of said housing;
said impeller rib and said rib situated on one face of said housing together define an annular passage used for axially balancing said rotary shaft;
the first and second elastic elements are annular washers fixed at their outer ends to said housing by fasteners, the inner ends of said washers being free to deform in bending in the direction of the axis of rotation of said rotary shaft;
a pusher is situated between the first elastic element and the outer ring of said rolling bearing, said first elastic element of stiffness k1 being able to press said pusher firmly against said outer ring in such a way that when the pump is running normally, the pusher is able to exert on said outer ring a force which extends the life of said bearing.

* * * * *